Aug. 12, 1969         R. FELDMAN         3,461,289
DIFFERENTIAL ABLATION MEASUREMENT OF HEAT SHIELDS USING
A PLURALITY OF RADIOACTIVE MATERIALS
Filed July 22, 1966                                   3 Sheets-Sheet 1

INVENTOR.
RUBIN FELDMAN
BY
ATTORNEY.

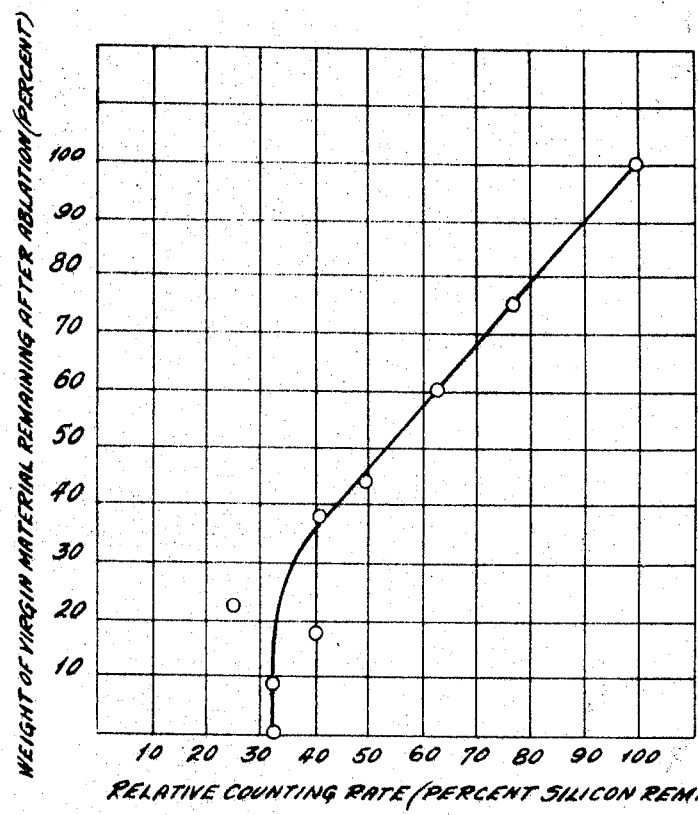
FIG. 3
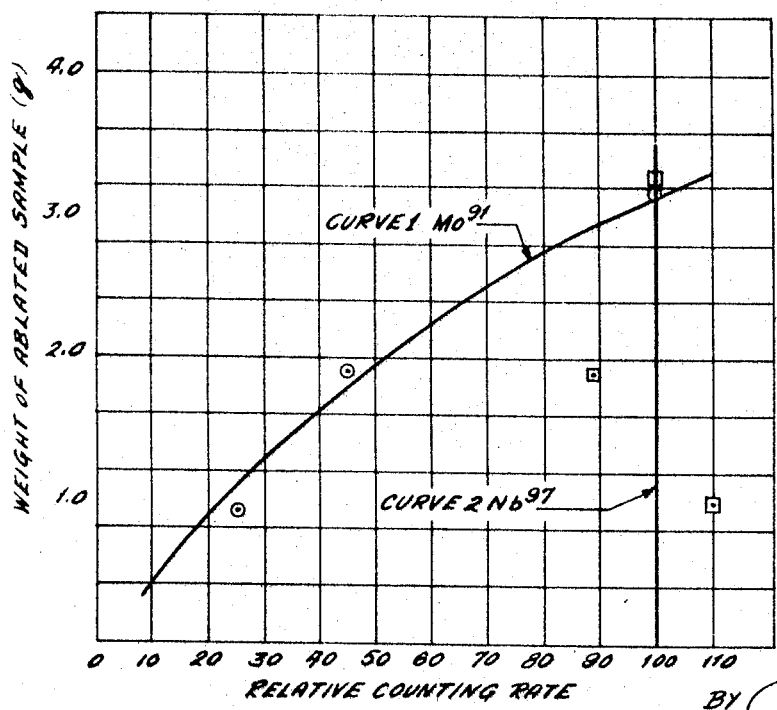
FIG. 4
INVENTOR.
RUBIN FELDMAN
BY
ATTORNEY.

III INITIAL TEST

II BENCH AND GROUND TESTS

I AIRBORNE AND GROUND MONITORING SYSTEM

INVENTOR.
RUBIN FELDMAN
BY
ATTORNEY.

United States Patent Office 3,461,289
Patented Aug. 12, 1969

---

3,461,289
DIFFERENTIAL ABLATION MEASUREMENT OF HEAT SHIELDS USING A PLURALITY OF RADIOACTIVE MATERIALS
Rubin Feldman, Creve Coeur, Mo., assignor, by mesne assignments, to Thermal Systems, Inc., Clayton, Mo., a corporation of Missouri
Continuation-in-part of application Ser. No. 311,816, Sept. 26, 1963. This application July 22, 1966, Ser. No. 567,224
Int. Cl. H01j *39/00*
U.S. Cl. 250—83       8 Claims

ABSTRACT OF THE DISCLOSURE

A method of measuring the rate of ablation or sublimation of different components of a debris producing heat shield, by introducing into an area of the shield two or more radioactive elements which have different energy levels. The elements are chosen to ablate under different conditions, preferably conditions which closely approximate those under which specific components of the heat shield ablate. Monitoring equipment simultaneously detects the change in counting rate for each element.

---

Sublimating compositions, examples of which are given in my Patent No. 3,022,190, have become of importance in the cooling of hypervelocity vehicles. This invention has particular application, and will be described as applied to sublimating compositions, but its usefulness is not confined thereto. The present application is a continuation-in-part of my application Ser. No. 311,816, filed Sept. 26, 1963, now abandoned.

Sublimating or ablating materials used as heat shields may be classified, for the purposes of this description, as debris producing and non-debris producing. A debris producing coating in most instances leaves a carbonaceous debris layer, the products of pyrolysis, on top of the so-called virgin material. The virgin material sublimes or "ablates." The debris layer is refractory and recedes primarily by erosion. The term "coating" is used broadly herein to indicate a part of a structure which has an exposed surface. It may be thin or it may be quite thick, and may be self-supporting, formed by building up of layers on a supporting surface, or by casting as a structurally stable shape itself, or in any of numerous other ways.

Heretofore, it has been found difficult to measure the "ablation rate" (the rate at which the coating is removed) of debris producing heat shields. In the case of simulated in-flight testing, the material consumption rate has been estimated from high-speed profile movies, or from the observation of weight or dimensions before and after testing. Some experimenters have used thermocouples, and break wires buried at different levels in the coating. Other techniques, involving various capacitance devices, for example, have been applied. Each of these methods has had limitations which have made the determination of the removal rate difficult, even on a gross material loss basis, and have not permitted at all the determination of removal rates of particular components of coatings.

One of the objects of this invention is to provide a method of measuring the rate and the absolute amounts of ablation of specific components of a coating.

Another object is to provide such a method which is applicable to in-flight measurements by reason of its use of standard telemetry systems, and also ground test measurement techniques.

Other objects will become apparent to those skilled in the art in the light of the following description.

In the drawings:

FIGURE 3 is a graph of counting rate indicating disappearance, during a part of a period of sublimation, of silicon from a glass-fiber reinforced plug of sublimating composition in Example II;

FIGURE 4 is a graph showing counting rate of molybdenum hexacarbonyl at various stages of sublimation and illustrating the counting characteristic of a refractory material which does not sublime (niobium oxide or carbide), from Example III;

Figure 1:
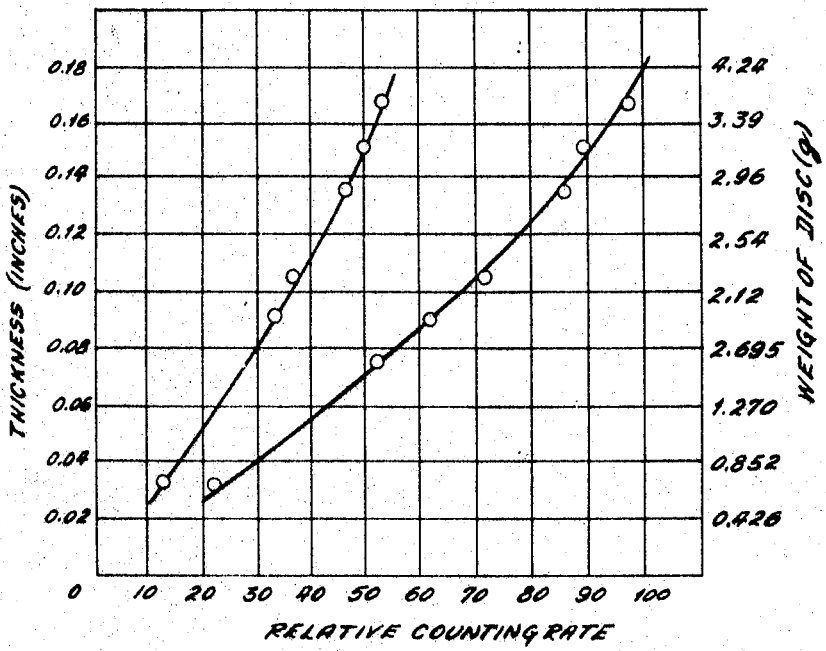
FIGURE 1 is a graph illustrating correlation between counting rate and thickness of test plugs of Example I.

In accordance with this invention, generally stated, a plurality of radioactive materials, with distinctly different energy levels, are incorporated in one matrix in a structure or coating. Preferably, the radioactive material is contained in and uniformly distributed through the thickness of a "plug" of material which otherwise exhibits the same characteristics as the rest of the surface of a heat shield. The radioactive elements are of two sorts, those which are expected to sublime and thus to disappear, their disappearance being signalled by a decrease in counting rate, and those which are expected to stay in the char or debris layer. The latter are of two sorts, those which are part of a refractory material in the coating (e.g. silicon 28 in glass fiber) and those which react during the heating phase to form a refractory material. The change in counting rate, which is a function of the decrease in the mass of each radioactive material, is utilized to determine both the rate of ablation and the magnitude of the ablation of each component which is taking place. A detector system capable of differentiating between energy levels monitors radiation from each of the radioactive materials. Detected counts are integrated and supplied as outputs of the monitoring system. Components of the coating which upon exposure of the coating to temperatures above the sublimation temperatures of the subliming components remain in the debris layer may be activated with a tracer of one energy level, and the virgin (subliming) material may be activated with a tracer of energy of different level. Also, different elements of the debris forming and virgin materials may be activated to different energy levels.

The radioactive elements may be chemically incorporated into the materials, or they may be created by electron or neutron bombardment of the materials, either before or after deposition. The radioactive elements need not be isotopes of the coating materials. They may instead be elements which are chosen for favorable energy levels and half-lives, and which decompose or volatilize at temperatures near those at which the virgin material and char layer are removed. Thus, one element may volatilize at a temperature near the sublimation temperature of the virgin material, and the other element may be stable up to a temperature above that expected to be encountered by the char.

The result of the method is that a measure is made of the action and interaction of two different components of the coating or structure during the course of heating of the structure or coating. In particular, in measuring the action of an ablating or sublimating type heat shield, it is possible with this method to distinguish the virgin material from the char layer, to measure the rate of recession of both, and to determine the mechanics of the production of the char layer, and the way in which the virgin material ablates or sublimates.

The use of the method of this invention has already revealed matters which had not been discovered heretofore. For example, it has been found that in a subliming composition containing ammonium fluoroborate, the thickness of the coating, measured mechanically, after a period of ablation, is greater than the thickness indicated by the method of this invention in which the fluorine was made radioactive. This indicated that the ammonium fluoroborate was subliming from beneath the surface of the virgin material, as well as at the surface, and this indication has been confirmed.

The method of this invention is also useful in determining whether there has been a recombination of sublimed and decomposed materials, and the nature of any newly formed materials.

The particular radiation sensing and discriminative device which is used does not form a part of this invention. Commercial scintillation counters are available and can be used, and can easily discriminate between radiations differing in energy as little as five percent. One difficulty with scintillation counters is that the necessary photo multiplier is rather bulky and fragile. Photo multipliers have been made rugged for missile applications so that the use of scintillation counters is not unfeasible for in-flight use. However, solid state charged particle detectors which are small and rugged, may be used in those applications in which small size and great durability are requisite.

In order to impart the required radioactivity to the coating, the coating may be made up with commercially available isotopes, or isotopes may be generated within the material by neutron bombardment, either before or after the coating is applied. If the isotope is not of one of the coating materials, it may be introduced by common impregnation techniques.

It is possible that for some ablative coatings, the necessary neutron activation can be obtained with a small, portable, commercially available neutron source, with essentially no radiation hazard during activation, storage or ablation. Such a neutron generator has been found entirely satisfactory in use with experimental samples. The following examples are merely illustrative of the experiments showing the feasibility of the method of this invention.

Example 1

Eight samples of uniform surface area and density, but varying in thickness from .03 to .17 inch, were activated, each with a flux of about $10^9$ neutrons per square centimeter per second, for two minutes. Each sample was then placed on a scintillation counter, and the radiation counted for one minute.

The nuclear reaction involved in the activation of fluorine is $F^{19}+n^0 \rightarrow 2n^0+F^{18}$. The $F^{18}$ emits 0.65 mev. positrons which are converted to .511 mev. gamma annihilation radiation. This is the radiation which was measured to determine the amount of fluorine in the sample, which contained ammonium fluoroboride, as an ablating composition, and silicon, in the form of glass fibers, as a non-subliming, debris-forming, component. The silicon was also activated. The reaction for silicon is $Si^{28}+n^0 \rightarrow p+Al^{28}$. The $Al^{28}$ emits a gamma ray of 1.78 mev. energy.

The relative counting rates of the various samples are shown in FIGURE 1. An approximate precision of ±0.005 inch in the thickness measurement is indicated.

This example illustrates the soundness of the assumption that, for a given density and radiation level, the thickness of the radioactive material can be determined by its relative counting rate.

Example 2

Six samples of a glass fiber reinforced, ammonium fluoroboride-containing sublimating material, each in the form of a disc 1¼ inches in diameter and 0.20 inch thick, were ablated for periods of time varying from one to five minutes, under an infrared heat fixture. These samples were then activated, in the same manner as the samples of Example 1. The activation products from the silicon and fluorine were then counted. The samples were weighed. The debris layer was then scraped off down to the remaining virgin material, and the virgin material thickness and weight measured mechanically.

Figure 2:
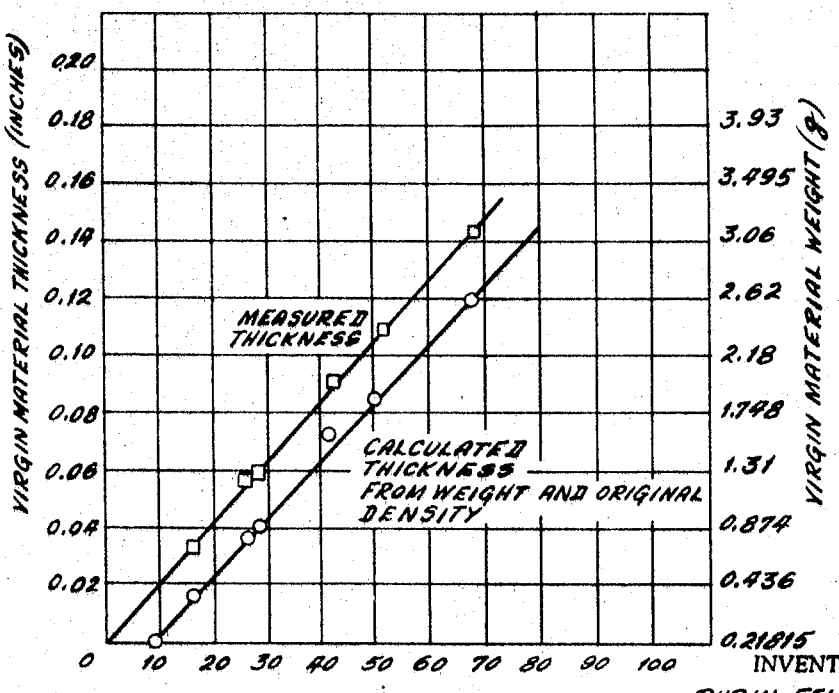
FIGURE 2 is a graph illustrating correlation between counting rate and density of test plugs as compared with thickness alone, after partial sublimation, of Example II.

The results are shown in FIGURE 2. The lower curve represents the actual results in terms of relative counting rates of fluorine 18. In terms of weight of virgin material, there is close correspondence between the results obtained in Example 1 in which there was no ablation. However, as is indicated by the upper of the two curves in FIGURE 2, there is apparent discrepancy between the thickness measured mechanically and the calculated thickness. This merely indicated, however, that the fluorine was removed from the subliming composition somewhat selectively, leaving a matrix of virgin material of lower gross density.

The relative counting rates of the silicon revealed an interesting result. It had been known, from chemical analysis of silicon in the debris layer of ablated material of the composition of the samples of this example, that the silicon became one component of the debris layer. If all of the silicon were uniformly retained in the debris layer, then the radioactive detremination of silicon could be used for the measurement of debris layer recession. However, the results shown in FIGURE 3 indicate that this is not the case. Surprisingly, under the low heat flux used in ablating these samples, the silicon was removed as rapidly as the fluorine until the ablation was approximately two-thirds complete. After that, very little more silicon was removed. It is readily apparent that the method of this invention has great value in the determination of the mechanisms by which the ablating materials act in use, and in improving their effectiveness.

Example 3

A disc of reinforced sublimating material containing molybdenum hexacarbonyl, 0.20 inch thick, was activated with the 14 mev. neutron flux of $10^9$ $n^0$ per square centimeter per second, for one hour. The resulting activity was measured, the sample was ablated with an infrared heat lamp, and the radioactivity was measured again. The disc was then again ablated and the radiation counted the third time. The sample was weighed between each ablation to obtain a measure of the salt removed.

The radio-chemical reactions involved are:

(1) 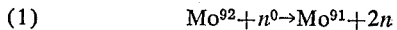$\qquad Mo^{92}+n^0 \rightarrow Mo^{91}+2n$

Mo has a half-life of 15.6 minutes and produces a 3.4 mev. positron. This in turn decays by the annihilation reaction to two gamma rays of 0.511 mev. each.

(2) $\qquad Mo^{97}+n^0 \rightarrow Nb^{97}+p$ $Nb^{97}$ has a half-life of 72 minutes and produces a gamma ray of 0.666 mev.

It will be observed from reaction 2 that some of the molybdenum is transmuted to a niobium isotope. Niobium and its oxide or carbide are very refractory compounds. They do not sublime, therefore. This, then, may provide a standard against which the decrease in counting rate of the molybdenum 91 isotope, which does sublime, may be measured. The results of this experiment are shown in FIGURE 3.

It is to be seen that the relatively low level of radiation generated by the neutron generator used in the foregoing examples, and the short half-life of the isotopes produced, limit the use of the method. However, commercially prepared radioisotopes, with high specific activity and long half-lives are readily available to be used as components of the subliming compositions. Also, the compositions can be activated in the thermo neutron flux of a uranium reactor such as the Ornl Graphite Reactor at Oak Ridge, In any event, the means for activating do not form a part of the present invention.

The radioactive element may also be in a material not normally a part of the heat shield.

Example 4

A ¼″ diameter plug of phenolic nylon heat shield material was impregnated with Zr-Nb$^{95}$C and In$^{114m}$Cl$_3$ by immersing thet plug in a solution containing the radioactive materials until it contained about 20 microcuries of activity of each material. The plug was then bonded into a 1″ diameter plug of the same heat shield material. The sample was then heated with an oxygen-acetylene torch, until the total thickness of the sample had decreased from 1″ to about 0.2″. The physically measured total thickness was about 0.04″ less than that predicted from the radiation data, whereas the physically measured virgin material thickness was about 0.06″ greater than that predicted.

In this example, In$^{114m}$Cl$_3$ which decomposes at 820° F., was used to follow the recession of the virgin layer which begins to decompose about 800° F., and Zr-Nb95C, which decomposes at 6400-7000° F., was used to follow the recession of the total thickness, and thus of the char layer. Since each has a half life of at least 50 days, the plugs can be installed in a heat shield sometime before they are to be used. In$^{114m}$ and Zr-Nb$^{95}$ have distinct levels of major gamma emission, at 0.19 mev. and 0.72-0.77 mev. respectively. Therefore, the two sources are easily discriminated. Only a small In$^{1114m}$ peak at 0.72 mev. must be corrected for.

Figure 5:
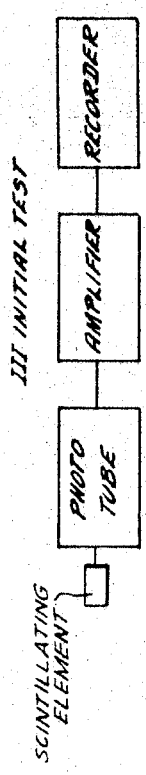
FIGURE 5 is a block diagram illustrating a circuit suitable for initial measurements.
Figure 6:
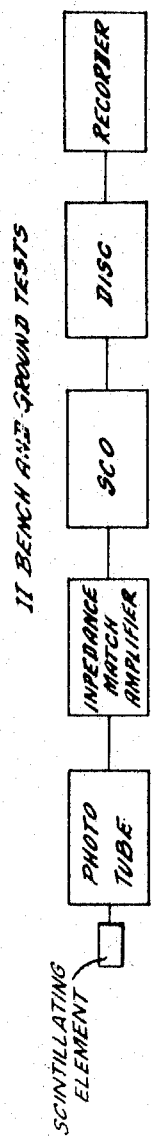
FIGURE 6 is a block diagram illustrating a circuit suitable for bench and ground measurements.
Figure 7:
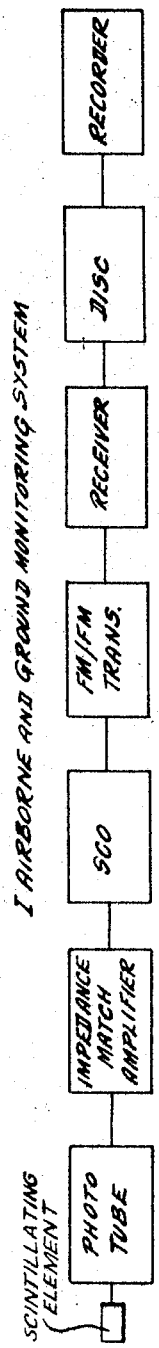
FIGURE 7 is a block diagram illustrating a circuit suitable for an airborne and ground monitoring system.

The circuitry of an airborne system by which the method of this invention is carried out, can be conventional. Circuit diagrams shown in FIGURES 5, 6 and 7 illustrate suitable circuits for the initial test (Examples 1, 2 and 3), bench and ground test, and an airborne and ground monitoring system, respectively. In the latter, the output of a photo tube is coupled into an isolation and impedance matching amplifier to match the high impedance output of the photo tube to the input impedance of a subcarrier oscillator. This subcarrier oscillator is a standard FM IRIC unit, in whichthe output frequency is proportional to the input voltage. A high frequency unit, 70 kc. center frequency, will be utilized for maximum count response. The output of the subcarrier oscillator is fed to a standard FM/FM transmitter. The photo tube, impedance matching amplifier, subcarrier oscillator and FM/FM transmitter constitute the airborne part of the unit. The signal from the FM/FM transmitter can be demodulated by any FM/FM ground station, and converted to sensible form in any usual manner.

Having thus described the invention, what is claimed and desired to be secured by Letters Patent is:

1. A method of measuring the rates of ablation of a plurality of components of a layer of material, comprising incorporating in one matrix in said layer a plurality of radioactive materials adapted to ablate discretely with particular components of said layer, said radioactive materials having distinctly different energy levels, exposing said layer to ablative conditions, and discriminating said energy levels.

2. A method of measuring the rates of formation and removal of a char layer formed by and on a layer of virgin material exposed to heat, comprising incorporating in one matrix in said layer of virgin material at least two radioactive materials having distinctly different energy levels one of said radioactive materials being adapted to ablate with said virgin material and another of said radioactive materials being adapted to ablate with said char layer, exposing said layer of virgin material to heat, and discriminating said energy levels.

3. A method of measuring the rate of ablation of a layer of material having a plurality of components known to ablate at different conditions of heat, comprising rendering at least two of said components radioactive, at distinctly different energy levels from one another, sensing radiation from said layer, discriminating said different energy levels and concurrently measuring the counting rates of said radiations of said energy levels, over known increments of time, as said material is exposed to heat, and correlating the said rates with known standards.

4. A method of measuring ablation of a heat shield containing a sublimating composition and a debris-layer producing component comprising, in a limited area of said shield, rendering at least one element of each of said sublimating composition and debris layer-producing components radioactive, said elements, when rendered radioactive having distinctly different energy levels from one another, sensing radiation from the radioactive part of said heat shield, discriminating said different energy levels and concurrently measuring the counting rate of said radiations of said energy levels over known increments of time, as said heat shield is exposed to ablative conditions, and comparing the changes of counting rate of a radioactive element of the sublimating composition with that of a radioactive element of the debris layer forming component.

5. A method of measuring ablation of a layer of material comprising incorporating into said layer a molybdenum compound which sublimes at a temperature to which the layer is to be exposed and a compound which upon heating to the said temperature will produce, with niobium, a refractory compound, activating said molybdenum by neutron bombardment to produce radioactive molybdenum and radioactive niobium, sensing radiations from said molybdenum and niobium, discriminating said radiations and concurrently measuring the counting rates of said radiations over known increments of time while exposing said layer to temperature at least as great as the sublimation temperature of said molybdenum compound.

6. The method of claim 5 wherein the molybdenum compound is molybdenum hexacarbonyl.

7. The method of analyzing the formation of a char layer on a sublimate coating comprising rendering radioactive an element of the sublimate coating which when exposed to heat in the presence of other elements of said sublimate coating reacts to form a more refractory material than the virgin sublimate, rendering radioactive an element of said sublimate coating having a sublimation temperature comparable with the first said element, said second element being unreactive to form a more refractory material and having a distinctly different energy level from said first radioactive element, heating said sublimate coating and discriminating said energy levels.

8. A method of measuring the rate of ablation of a layer of material having a plurality of components known to ablate at different rates under the same conditions of heat, comprising rendering at least two of said components radioactive, at distinctly different energy levels from one another, sensing radiation from said layer, discriminating said different energy levels and concurrently measuring the counting rates of said radiations of said energy levels, over known increments of time, as said material is exposed to heat, and correlating the said rates with known standards.

References Cited

UNITED STATES PATENTS 2,874,303   2/1959   Lane.
3,101,413   8/1963   Schaschl et al.

OTHER REFERENCES

Radionuclides Measure Nose Cone Wear in Flight, by E. R. Rathbun, from Nucleonics, February 1961, pp. 100, 101, 250–106T.

ARCHIE R. BORCHELT, Primary Examiner

U.S. Cl. X.R.

250—83, 106

UNITED STATES PATENT OFFICE
CERTIFICATE OF CORRECTION

Patent No. 3,461,289                                              August 12, 1969

Rubin Feldman

It is certified that error appears in the above identified patent and that said Letters Patent are hereby corrected as shown below:

Column 4, line 28, "detremination" should read -- determination --; line 52, "Mo" should read -- $Mo^{91}$ --; line 75, "Ornl" should read -- ORNL --. Column 5, line 9, "thet" should read -- the --; line 29, "$In^{114m}$" should read -- $In^{114m}$ --.

Signed and sealed this 28th day of July 1970.

(SEAL)
Attest:

Edward M. Fletcher, Jr.                                    WILLIAM E. SCHUYLER, JR.
Attesting Officer                                                  Commissioner of Patents